Oct. 28, 1924.  1,513,674
J. S. REID
BELT TIGHTENER AND ALIGNMENT DEVICE
Filed Aug. 15, 1922
Fig. 1.
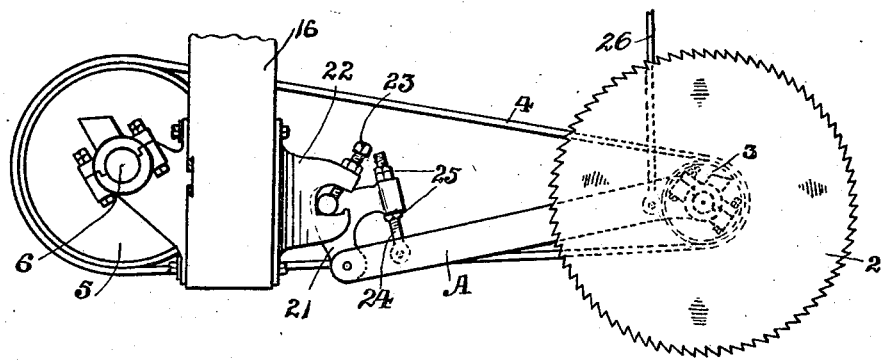
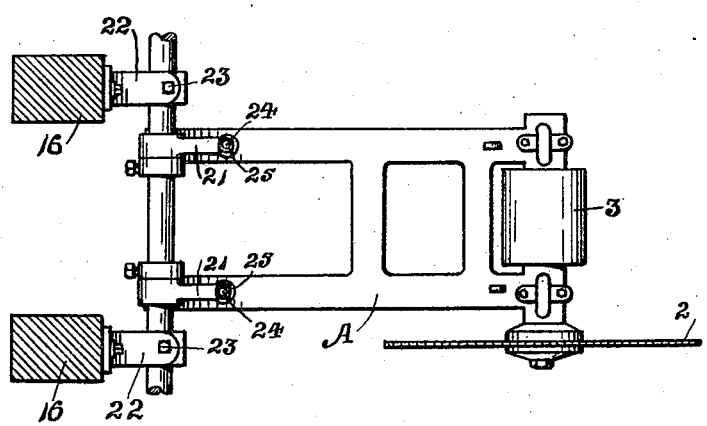
Fig. 2.
Joseph S. Reid, Inventor
By Vernon E. Hodges
his Attorney Patented Oct. 28, 1924.

1,513,674

UNITED STATES PATENT OFFICE.

JOSEPH S. REID, OF OLEAN, NEW YORK, ASSIGNOR TO CLARK BROTHERS COMPANY, A CORPORATION OF NEW YORK.

BELT TIGHTENER AND ALIGNMENT DEVICE.

Application filed August 15, 1922. Serial No. 581,978.

*To all whom it may concern:*

Be it known that I, JOSEPH S. REID, a citizen of the United States, residing at Olean, in the county of Cattaraugus and State of New York, have invented certain new and useful Improvements in Belt Tighteners and Alignment Devices, of which the following is a specification.

My invention relates to an improvement in belt tighteners and aligning devices.

My present invention is applicable to various types of machinery, such as lumber trimmers of various types, for example air lifting trimmers, electrically-operated trimmers, and various forms of hand-operated trimmers. In order to reduce to a minimum the effort required to move the saw into or out of operating position, it is desirable to employ a device for easily keeping the driving-belt just tight enough to drive the saw, but not so tight as to unnecessarily increase the friction on the pivots on which the saw frame turns. Moreover these pivots for the saw frame should be so located with reference to the centers of the driving and driven pulleys that when the saw is moved into the sawing position, the driving belt is somewhat tightened.

If the belt is tightened sufficiently to drive the saw, then the effort required to swing the saw frame is necessarily increased. If there is no convenient, effective device for tightening these belts, (and there are many of them on the usual trimmer) the workman when resplicing a belt that has stretched until it has become too loose, is very apt to make the belt quite tight, tighter than is necessary in order to drive the saw, this being done in order to avoid another re-splicing in the near future.

My present invention is a simple and convenient device for tightening these belts, and is also available for aligning each saw-frame, so that if the belt runs incorrectly on its pulley, it can be adjusted and corrected by this device.

In the accompanying drawings:

Fig. 1 is a view in side elevation;

Fig. 2 is a fragmentary plan view.

While the drawings illustrate my invention with a particular type of lumber trimmer, it is employed merely as illustrative, and not as limiting the application in any way.

A, represents a saw-frame; 2, a saw; 3, a pulley; 4, a belt; 5, a pulley on the drive-shaft 6. The tightening and aligning of the belt 4 is accomplished by pivoting the saw-frame to a bell-crank 21, which is pivotally and removably held in a bracket 22 secured to a framework 16, preferably by set-screw 23. The saw-frame is pivoted to the lower end of the bell-crank 21, as shown in Fig. 1, and an eye-bolt 24 pivoted to the saw-frame A and extending through one end of the bell-crank lever 21 has nuts 25 on its threads on either side of the bell-crank, which are turned for adjusting the eye-bolt endwise, and thereby moving the saw-frame A with respect to its support, thus applying tension upon the belt 4. The rod 26, connected at one end to the saw frame A, may be connected at its opposite end to any suitable mechanism for moving the saw frame into and out of sawing position.

This is a simple and effective means for tightening any belt and for aligning the belt pulleys, since there are two of these bell-crank levers, eye-bolts, and adjustments for each saw-frame, as shown in Fig. 2.

I claim:

1. The combination of a rotating member, a swinging saw-frame carrying a saw, a belt for driving the saw, a belt-tightener including a bell-crank lever to which the swinging saw frame is pivoted, and means connected with the saw-frame and adjustably connected with the bell crank lever for applying tension upon the belt.

2. The combination of a rotating member, a swinging saw-frame carrying a saw, a belt for driving the saw, a belt-tightener including a bell-crank lever to which the swinging saw frame is pivoted, means connected with the saw-frame and adjustably connected with the bell-crank lever for applying tension upon the belt, said means comprising an eye-bolt pivoted to the swinging saw-frame and extending through the bell-crank lever, and nuts adjustable on the eye-bolt on either side of the bell-crank lever for adjusting and holding the eye-bolt and with it the swinging saw-frame.

3. The combination of a rotating member, a swinging sawframe carrying a saw, a belt for driving the saw, a belt tightener including a bell crank lever to which the swinging sawframe is pivoted, means for removably and pivotally supporting the bell crank lever, and means connected with the sawframe and adjustably connected with the bell crank lever for applying tension upon the belt.

In testimony whereof I affix my signature.

JOSEPH S. REID.